US011947638B2

(12) United States Patent
Goecke et al.

(10) Patent No.: US 11,947,638 B2
(45) Date of Patent: *Apr. 2, 2024

(54) METHODS AND APPARATUS FOR AUTOMATIC PERMISSION ASSIGNMENT

(71) Applicant: Walmart Apollo, LLC, Bentonville, AR (US)

(72) Inventors: Danika Alleen Goecke, Lowell, AR (US); Amanda Lamberti Ragone, Leander, TX (US); David Chen, Bentonville, AR (US); Bradley Wayne Norman, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,025

(22) Filed: Jan. 19, 2023

(65) Prior Publication Data

US 2023/0161850 A1    May 25, 2023

Related U.S. Application Data

(63) Continuation of application No. 16/989,507, filed on Aug. 10, 2020, now Pat. No. 11,609,974.

(51) Int. Cl.
*G06F 21/12* (2013.01)
*G06F 21/62* (2013.01)

(52) U.S. Cl.
CPC ............ *G06F 21/12* (2013.01); *G06F 21/629* (2013.01); *G06F 2221/2111* (2013.01); *G06F 2221/2141* (2013.01)

(58) Field of Classification Search
CPC ................... G06F 21/12; G06F 21/629; G06F 2221/2111; G06F 2221/2141
See application file for complete search history.

(56) References Cited

U.S. PATENT DOCUMENTS 6,578,029 B2    6/2003    Gershfield
8,402,514 B1    3/2013    Thompson et al.
(Continued)

OTHER PUBLICATIONS

Google Scholar NPL, 2022, 2 pages.

*Primary Examiner* — Hee K Song
(74) *Attorney, Agent, or Firm* — Morgan, Lewis & Bockius LLP; Manita Rawat

(57) ABSTRACT

This application relates to apparatus and methods for automatically determining and enforcing user permissions for applications and application features. In some embodiments, a system includes a server and a user device. The server may determine a user of the user device based on receiving login credential data. The server may further obtain user attributes for the user including, in some examples, a location of the user. The server may further obtain an attribute-based control policy that identifies relationships between a plurality of possible user attributes. For example, the control policy may identify attribute requirements that must be met for enablement of a particular application feature. Additionally, the server may determine user permissions for the user based on the control policy and the user attributes. The server may transmit the user permissions to the user device, and the user device configures the corresponding application according to the user permissions.

20 Claims, 11 Drawing Sheets

(56) References Cited

U.S. PATENT DOCUMENTS

| | | |
|---|---|---|
| 9,137,263 B2 | 9/2015 | Chari et al. |
| 10,218,711 B2 | 2/2019 | Smith et al. |
| 10,462,184 B1 | 10/2019 | Gu et al. |
| 2002/0062449 A1 | 5/2002 | Perna et al. |
| 2006/0069915 A1 | 3/2006 | Koeda |
| 2014/0090026 A1 | 3/2014 | Mishra et al. |
| 2019/0362087 A1* | 11/2019 | Ferrans ................. H04L 63/102 |
| 2021/0006596 A1* | 1/2021 | Beredimas .............. H04L 63/20 |
| 2021/0385190 A1 | 12/2021 | Jasper et al. |

\* cited by examiner

METHODS AND APPARATUS FOR AUTOMATIC PERMISSION ASSIGNMENT

CROSS-REFERENCE TO RELATED APPLICATION

This application is a continuation of U.S. patent application Ser. No. 16/989,507, filed Aug. 10, 2020, and entitled "METHODS AND APPARATUS FOR AUTOMATIC PERMISSION ASSIGNMENT," which is incorporated herein in its entirety by reference.

TECHNICAL FIELD

The disclosure relates generally to application permission assignments, and more specifically, to assigning permissions to allow user access to features within applications.

BACKGROUND

At least some companies, such as large companies or enterprises, maintain a system that supports applications among various end users, such as employees. Each user may have access to one or more of the supported applications. For example, an Information Technology (IT) specialist may assign permissions to a new employee joining the company, thereby allowing the new employee to access one or more applications. In at least some examples, the permissions for a new employee may be based on permissions for an existing employee. For example, the IT specialist may assign a same set of permissions allowing access to a subset of applications to each new employee that joins the company. In other examples, all permissions may be denied upon a new employee joining the company. Thus, a new employee may need to request, such as from the IT specialist, permissions for each application the new user would like to use. Moreover, even current employees may need to request permissions for the use of applications the current employee cannot yet access, but wishes to do so. Each of these methods, however, may require the employee to interact with various employees and systems to receive permissions for each application. These current solutions may cause delays, such as while waiting on permission approval, as well as in determining how to gain access to a particular application. As such, there are opportunities to address problems with permission assignment systems and methods.

SUMMARY

The embodiments described herein are directed to automatically determining, assigning, and enforcing application and application feature permissions for a user (e.g., person, employee, etc.). Each permission controls the use of an application, or of an application feature, by a particular user. For example, each permission may allow, disallow, modify, or restrict the use of an application or an application feature. In some examples, a permission may allow a user to view or even access an application (or a feature of an application). In other words, the permission may control the enabling, or disabling, of an application (or a feature of an application). The permissions may be determined based on an attribute-based control policy that identifies relationships between a plurality of possible attributes. The attributes may include, for example, one or more of the user's job title, the user's role, a facility associated with the user, a geographical area, an employee ranking level (e.g., manager, senior manager, executive, etc.), a time period (e.g., time of year, month, week, etc.), and a location of the user (e.g., a facility the user is located in), among other attributes. Permissions for a particular user are determined based on attributes for that user and the attribute-based control policy. The permissions may be enforced, in some examples, by the corresponding applications. For example, the applications may be configured according to determined permissions for a user (e.g., the applications may execute in accordance with the permissions for the user). As such, the user's use of each application is in accordance with determined permissions for that user.

Among other advantages, the embodiments may allow for a single point of access control that simplifies application and role management for IT administrators, as well as end users. For example, the embodiments may leverage attributes of users as a single source of truth across multiple features (e.g., capabilities) exercised by multiple applications thereby streamlining a user's access to the applications and their features. In addition, the embodiments may provide a scalable platform that can be employed across various systems and use cases. Moreover, the embodiments may allow companies to manage risk, such as security risk, by assigning permissions according to each user's attributes, including, in some examples, a location of each user.

In some embodiments, a system comprises a first computing device, such as a server (e.g., a centralized server, a cloud-based server), and at least one second computing device, such as a workstation or mobile device. The first computing device may be operated by IT personnel of a company, for example, while the second computing device may be operated by an employee of the company. The first computing device may determine a user of the second computing device, for example, by receiving login credential information from the second computing device when the user attempts to log into the second computing device. The first computing device may then obtain the plurality of attributes for the determined user.

In some examples, the plurality of attributes includes a location of the user based on a location of the second computing device. For example, the second computing device may transmit Global Position System (GPS) data (e.g., longitude and latitude data) to the first computing device, and the first computing device may determine the location of the second computing device based on the GPS data.

In addition, the first computing device may obtain attribute-based control policy data from a database. The attribute-based control policy data may identify and characterize an attribute-based control policy that identifies relationships between possible user attributes required for a particular permission (e.g., such as application permissions and application feature permissions). For example, the attribute-based control policy may identify attribute conditions (e.g., requirements) that must be met for enablement of a particular application feature. The first computing device may determine one or more permissions for the user based on the attribute-based control policy. The first computing device may then transmit the determined permissions for the user to the second computing device. For example, the second computing device may request permissions for a particular application (e.g., via an Hypertext Transfer Protocol (HTTP) endpoint of an Application Programming Interface (API)), and in response, the first computing device may transmit the permissions for the particular application to the second computing device.

In response to receiving the permissions, the second computing device may configure one or more corresponding applications based on the permissions, and may further execute the one or more corresponding applications in accordance with their configuration. For example, an executed application may have a feature enabled, or disabled, based on the configuration. The executed application may not allow for the execution of a disabled application feature, but may allow for the execution of an enabled application feature, for example. As another example, an executed application may prevent from displaying a disabled application feature, and may display an enabled application feature. As yet another example, an executed application may prevent a user from accessing a disabled application feature, and may allow the user to access an enabled application feature.

In some embodiments, a system includes a server and a user device. The server may determine a user of the user device based on receiving login credential data. The server may further obtain user attributes for the user including, in some examples, a location of the user. The server may further obtain an attribute-based control policy from a database. Additionally, the server may determine user permissions for the user based on the attribute-based control policy and the user attributes. For example, the server may determine whether the user attributes satisfy conditions identified in the attribute-based control policy for one or more permissions. The server may generate the user permissions based on the determinations. The server may transmit the user permissions to the user device, and the user device configures the corresponding application according to the user permissions.

In some embodiments, a first computing device is configured to receive a request for data for an application from a second computing device. The first computing device is also configured to determine a user of the second computing device, and obtain, from a database, a plurality of attributes of the user. Based on an attribute-based control policy stored in the database and the plurality of attributes for the user, the first computing device is configured to determine at least one permission for the application for the user. The first computing device is further configured to transmit the at least one permission for the user to the second computing device.

In some embodiments, a first computing device is configured to transmit a request for data for an application to a second computing device. In some examples, the second computing device is configured to determine at least one permission for the application for the user based on an attribute-based control policy and a plurality of attributes for the user. The first computing device is further configured to receive, in response to the request for data, the at least one permission for the user. The first computing device is also configured to configure the application based on the at least one permission for the user. Further, the first computing device is configured to execute the configured application in response to at least one input from the user. The executed application may allow, or disallow, corresponding features of the application from being accessible by the user based on the received permissions, for example.

In some embodiments, a first computing device is configured to receive a request for data for an application from a first computing device. The first computing device is also configured to obtain, from a database, an attribute-based control policy for the application, where the attribute-based control policy defines permissions for the application based on a plurality of attributes. In some examples, the first computing device is configured to identify the attribute-based control policy for the application from a plurality of attribute-based control policies based on the request. The first computing device is further configured to transmit the attribute-based control policy for the application to the second computing device.

In some embodiments, a first computing device transmits a request for data for an application to a second computing device. In some examples, the second computing device is configured to transmit an attribute-based control policy for the application to the first computing device. The first computing device is further configured to receive, in response to the request for data, the attribute-based control policy for the application from the second computing device. The first computing device is also configured to determine a plurality of attributes for the user. In some examples, at least one attribute includes a location of the first computing device. Further, the first computing device is configured to determine at least one permission for the user based on the attribute-based control policy and the plurality of attributes for the user. The first computing device is also configured to configure the application based on the at least one permission for the user. The first computing device is further configured to execute the configured application in response to at least one input from the user. The executed application may allow, or disallow, corresponding features of the application from being accessible by the user based on the received permissions, for example.

In some embodiments, a method by a first computing device includes receiving a request for data for an application from a second computing device. The method includes determining a user of the second computing device, and obtaining, from a database, a plurality of attributes of the user. Based on an attribute-based control policy stored in the database and the plurality of attributes for the user, the method includes determining at least one permission for the application for the user. The method further includes transmitting the at least one permission for the user to the second computing device.

In some embodiments, a method by a first computing device includes transmitting a request for data for an application to a second computing device. The method further includes receiving, in response to the request for data, at least one permission for the user. The method also includes configuring the application based on the at least one permission for the user. Further, the method includes executing the configured application in response to at least one input from the user. The executed application may allow, or disallow, corresponding features of the application from being accessible by the user based on the received permissions, for example.

In some embodiments, a method by a first computing device includes receiving a request for data for an application from a second computing device. The method includes obtaining, from a database, an attribute-based control policy for the application, where the attribute-based control policy defines permissions for the application based on a plurality of attributes. In some examples, the method includes identifying the attribute-based control policy for the application from a plurality of attribute-based control policies based on the request. The method also includes transmitting the attribute-based control policy for the application to the second computing device.

In some embodiments, a method by a first computing device includes transmitting a request for data for an application to a second computing device. The method also includes receiving, in response to the request for data, an attribute-based control policy for the application from the second computing device. The method also includes determining a plurality of attributes for the user. In some examples, at least one attribute includes a location of the first computing device. Further, the method includes determining at least one permission for the user based on the attribute-based control policy and the plurality of attributes for the user. The method also includes configuring the application based on the at least one permission for the user. The method further includes executing the configured application in response to at least one input from the user. The executed application may allow, or disallow, corresponding features of the application from being accessible by the user based on the received permissions, for example.

In some embodiments, a non-transitory computer readable medium has instructions stored thereon, where the instructions, when executed by at least one processor, causes the at least one processor to perform operations including receiving a request for data for an application from a computing device. The operations include determining a user of the computing device, and obtaining, from a database, a plurality of attributes of the user. Based on an attribute-based control policy stored in the database and the plurality of attributes for the user, the operations include determining at least one permission for the application for the user. The operations further include transmitting the at least one permission for the user to the computing device.

In some embodiments, a non-transitory computer readable medium has instructions stored thereon, where the instructions, when executed by at least one processor, causes the at least one processor to perform operations including transmitting a request for data for an application to a computing device. The operations further include receiving, in response to the request for data, at least one permission for the user from the computing device. The operations also include configuring the application based on the at least one permission for the user. Further, the operations include executing the configured application in response to at least one input from the user. The executed application may allow, or disallow, corresponding features of the application from being accessible by the user based on the received permissions, for example.

In some embodiments, a non-transitory computer readable medium has instructions stored thereon, where the instructions, when executed by at least one processor, causes the at least one processor to perform operations including receiving a request for data for an application from a computing device. The operations also include obtaining, from a database, an attribute-based control policy for the application, where the attribute-based control policy defines permissions for the application based on a plurality of attributes. In some examples, the operations include identifying the attribute-based control policy for the application from a plurality of attribute-based control policies based on the request. The operations also include transmitting the attribute-based control policy for the application to the second computing device.

In some embodiments, a non-transitory computer readable medium has instructions stored thereon, where the instructions, when executed by at least one processor, causes the at least one processor to perform operations including transmitting a request for data for an application to a second computing device. The operations also include receiving, in response to the request for data, an attribute-based control policy for the application. The operations further include determining a plurality of attributes for the user. In some examples, at least one attribute includes a location of the first computing device. Further, the operations include determining at least one permission for the user based on the attribute-based control policy and the plurality of attributes for the user. The operations also include configuring the application based on the at least one permission for the user. The operations further include executing the configured application in response to at least one input from the user. The executed application may allow, or disallow, corresponding features of the application from being accessible by the user based on the received permissions, for example.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
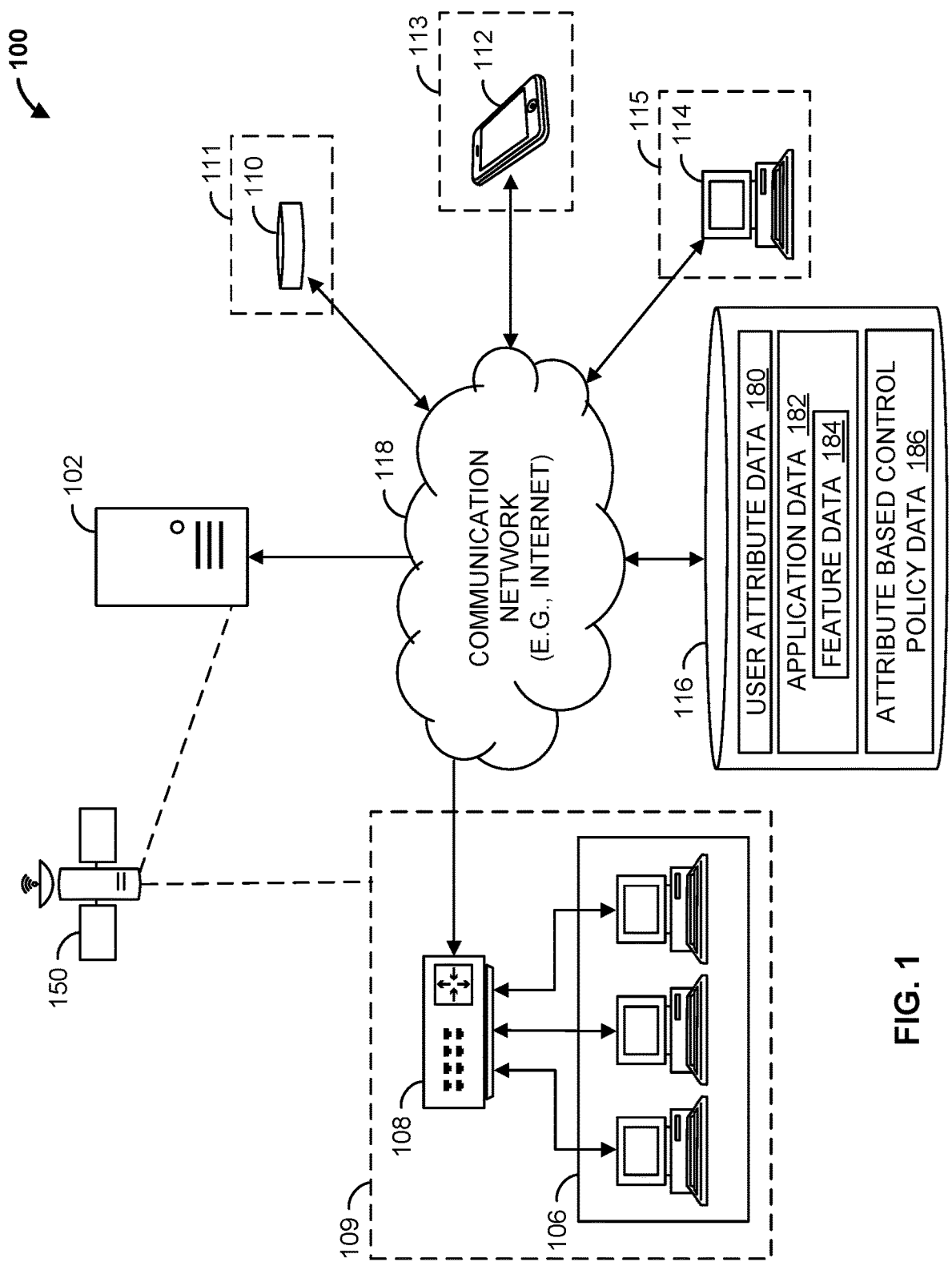
FIG. 1 is a block diagram of an application control system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an application control system 100 that includes a permission control computing device 102 (e.g., a server), workstation(s) 106, database 116, and multiple application processing devices 110, 112, 114 communicatively coupled over network 118. Permission control computing device 102, workstation(s) 106, and multiple application processing devices 110, 112, 114 can each be any suitable computing device that includes any hardware or hardware and software combination for processing data. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, each of permission control computing device 102 and workstation(s) 106 can be a computer, a workstation, a laptop, a server such as a cloud-based server, or any other suitable device. In some examples, control computing device 102 can be a server, a web server, a cloud-based server, or any suitable computing device that can host one or more webpages. In some examples, each of multiple application processing devices 110, 112, 114 can be a mobile device, a cellular phone, a smart phone, a tablet, a personal assistant device, a voice assistant device, a digital assistant, a laptop, a computer, a workstation, or any other suitable device. In some examples, permission control computing device 102 and workstation(s) 106 are each operated by a company (e.g., a retailer), and multiple application processing devices 110, 112, 114 are each operated by associates (e.g., employees, contractors, affiliated parties, etc.) of the company.

Although FIG. 1 illustrates three application processing devices 110, 112, 114, application control system 100 can include any number of application processing devices 110, 112, 114. Similarly, application control system 100 can include any number of permission control computing devices 102, workstation(s) 106, and databases 116.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Permission control computing device 102 may communicate with workstation(s) 106 and application processing devices 110, 112, 114 over communication network 118. Workstation(s) 106 may be operatively coupled to communication network 118 through router (or switch) 108.

Permission control computing device 102 is also operable to communicate with database 116 over communication network 118. For example, permission control computing device 102 can store data to, and read data from, database 116. Database 116 can be a remote storage device, such as a cloud-based server, a disk (e.g., a hard disk), a memory device on another application server, a networked computer with memory, or any other suitable storage device. Although shown remote to permission control computing device 102, in some examples, database 116 can be a local storage device, such as a hard drive, a non-volatile memory, or a USB stick.

In some examples, permission control computing device 102 stores user attribute data 180 in database 116. User attribute data 180 may identify and characterize attributes associated with each of a plurality of users. For example, the attributes may include a user's (e.g., employee's) job title, a department the user is associated with (e.g., marketing, engineering, management, sales, billing, etc.), the user's role, a facility associated with the user, a geographical area, a hire date or period, an address associated with the user (e.g., the user's home address), contact information for the user (e.g., phone number, address, email address), an employee ranking level, a time period, and a location of the user (e.g., a facility the user is located in), among other possible attributes.

Database 116 may further store application data 182 and attribute-based control policy data 186. Application data 182 identifies and characterizes one or more applications. The applications may be obtained and executed by, for example, application processing devices 110, 112, 114. For example permission control computing device 102 may obtain application data 182 from database 116, and provide one or more applications to each of application processing devices 110, 112, 114. The application processing devices 110, 112, 114 may then execute the applications. Application data 182 may include feature data 184 that identifies and characterizes features (e.g., capabilities) of each application. For example, feature data 184 may identify and characterize an API of each application for identifying and configuring features of an application.

Attribute-based control policy data 186 identifies and characterizes one or more attribute-based control policies. Each attribute-based policy may identify relationships between possible user attributes that are required for a particular permission for a particular application or application feature. For example, attribute-based control policy data 186 may identify and characterize a plurality of attribute-based control policies, where each attribute-based control policy corresponds to an application. Each attribute-based control policy further defines user attributes that are required for a user to have access to one or more features of that application. Each attribute-based control policy may be, for example, a lookup table, an algorithm that operates on user attributes, a structure, a state machine, or graph-based.

Figure 3:
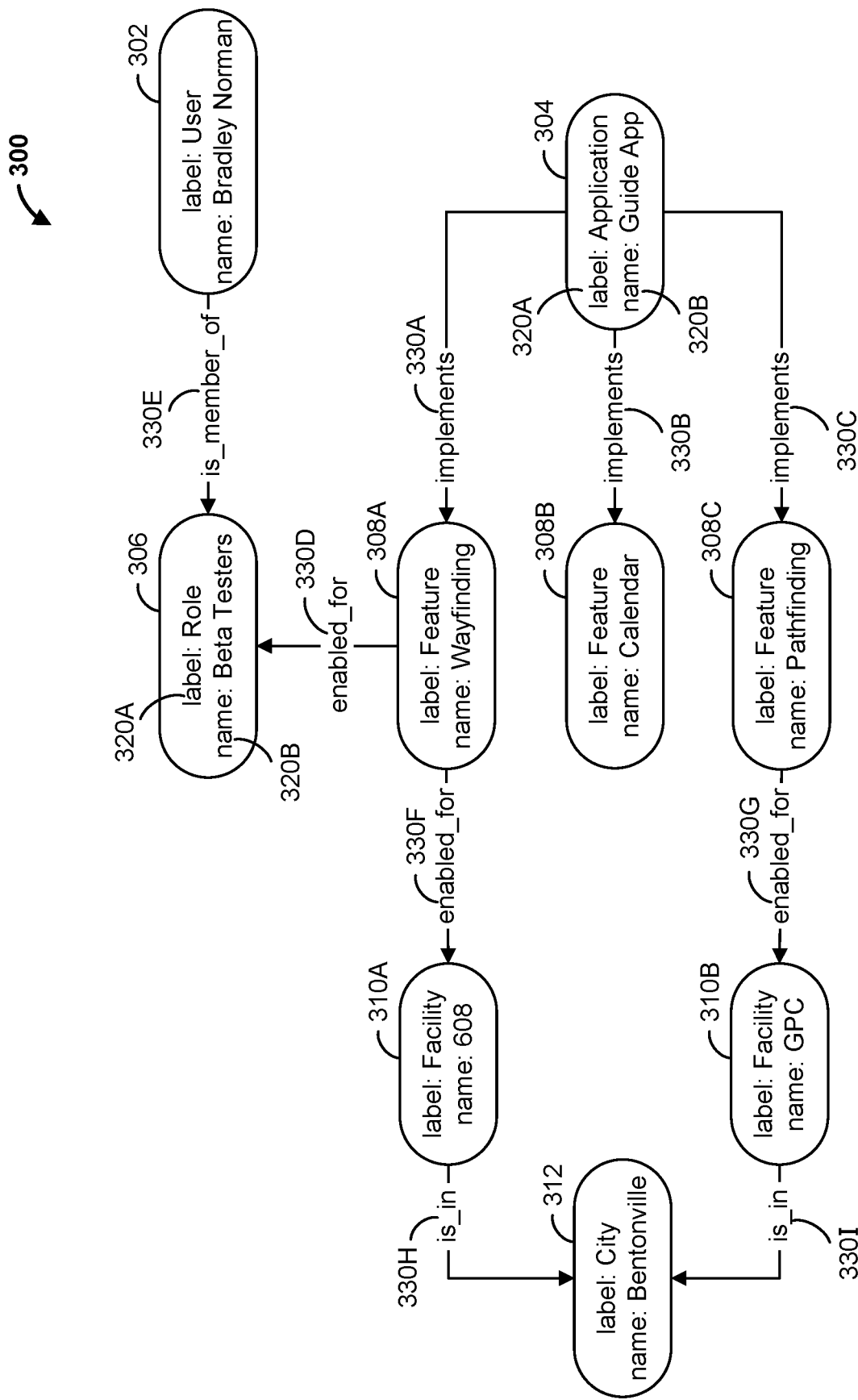
FIG. 3 illustrates an attribute-based control policy m accordance with some embodiments.

FIG. 3 illustrates a graphical example of an attribute-based control policy 300 that includes various nodes interconnected based on various conditions (e.g., requirements). A user operating permission control computing device 102 may configure attribute-based control policy 300, for example, and the configured attribute-based control policy 300 may be stored in database 116.

In this example, each node is of a particular type, as indicated by corresponding label 320A. For example, node 304 is an "Application" type of node. Node 304 is also referred to herein as application node 304. Each node also includes a corresponding name 320B that identifies the particular node within its corresponding node type. For example, node 304 includes name 320B "Guide App." As such, application node 304 is an "Application" type of node, and in particular represents a "Guide" application of the "Application" type of node. The Guide application may be, for example, a type of application that provides directions when travelling (e.g., a "Maps" application).

Application node 304 links to each of nodes 308A, 308B, 308C via implement links 330A, 330B, 330C, respectively.

Each of nodes 308A, 308B, 308C is a "Feature" type of node as indicated by their corresponding labels 320A. Nodes 308A, 308B, 308C are also referred to herein as feature nodes 308A, 308B, 308C. Feature node 308A includes name 320B "Wayfinding," feature node 308B includes name 320B "Calendar," and feature node 308C includes name 320B "Pathfinding." As such, feature node 308A is a "Feature" type of node that represents a "Wayfinding" feature of an application. Similarly, feature node 308B is a "Feature" type of node that represents a "Calendar" feature of an application, and feature node 308C is a "Feature" type of node that represents a "Pathfinding" feature of an application.

Further, each implementation link, such as implementation links 330A, 330B, 330C, link an application node, such as application node 304, to nodes identifying features (e.g., capabilities) of the application identified by the application node. For example, implementation links 330A, 330B, 330C link application node 304 to each of feature nodes 308A, 308B, 308C, respectively, indicating that application "Guide App" implements the features identified by feature nodes 308A, 308B, 308C, namely, "Wayfinding," "Calendar," and "Pathfinding."

Nodes 310A, 310B are "Facility" types of node as indicated by their corresponding labels 320A "Facility," referred to herein as facility nodes 310A, 310B. More particularly, facility node 310A represents facility "608" as indicated by its corresponding name 320B, and facility node 310B represents facility "GPC" is indicated by its corresponding name 320B. Each facility node 310A, 310B identifies a facility, such as a retail location, warehouse, sales location, distribution center, office, or any other facility.

Feature node 308A links to facility node 310A via enablement link 330F, and feature node 308C links to facility node 310B via enablement link 330G. Each enablement link 330F, 330G identifies a facility that the corresponding feature may be enabled for. For example, the "Wayfinding" feature of feature node 308A may be enabled for the facility of "608." However, because there is no enablement link from feature node 308A to facility node 310B, the "Wayfinding" feature is not to be enabled for the "GPC" facility. Similarly, the "Pathfinding" feature of feature node 308C may be enabled for the facility of "GPC." However, because there is no enablement link from feature node 308C to facility node 310A, the "Pathfinding" feature is not to be enabled for the "608" facility.

Each of facility nodes 310A, 310B are linked to node 312 via attribute links 330H, 330I, respectfully. Node 312 is a "City" type of node, and may be referred to herein as city node 312. Further, city node 312 represents city "Bentonville" as indicated by name 320B. As such, attribute-based control policy 300 indicates that facility "608" is in Bentonville, as indicated by attribute link 330H linking facility node 310A to city node 312. Similarly, facility "GPC" is also in Bentonville, as indicated by attribute link 330I linking facility node 310B to city node 312.

Feature node 308A is also linked, via enablement link 330D, to node 306, which is a "Role" node type as indicated by its corresponding label 320A. Node 306 may be referred to herein as role node 306. "Role" node types may identify nodes for various roles (e.g., positions, titles, etc.) of a user (e.g., employee), such as marketing, engineering, management, sales, or billing. In this example, role node 306 identifies the role of "Beta Testers" as indicated by corresponding name 320B. As such, feature node 308A is to be enabled for "Beta Testers" as indicated by enablement link 330D linking feature node 308A to role node 306.

Thus, and in accordance with attribute-based control policy 300, application "Guide App" identified by application node 304 implements the features of "Wayfinding," "Calendar," and "Pathfinding," as indicated by feature nodes 308A, 308B, 308C, respectively. In addition, feature node 308A is to be enabled for "Beta Testers," as indicated by role node 306, as well as facility "608," as indicated by facility node 310A. In addition, the feature of "Pathfinding" is to be enabled for the facility of "GPC" as indicated by facility node 310B.

In this example, the feature of "Calendar," as indicated by feature 308B, is not linked to a role node, a facility node, or a city node. As such, the feature of "Calendar" may be enabled for all users of application "Guide App." If, for example, an enablement link existed from feature node 308B to city node 312, then the feature of "Calendar" is to be enabled for the city of Bentonville, but not for users not associated with the city of Bentonville.

To apply attribute-based control policy 300 to a particular user, permission control computing device 102 generates a node 302 of type "User" for each user, which may be referred to as user node 302. In this example user nodes 302 are identified by label 320A "User." Each user node 302 may identify the particular user with a name 320B. In this example, user node 302 identifies "Bradley Norman" as a user. Moreover, each user node 302 may be linked to one or more nodes such as role nodes 306, facility nodes 310A, 310B, city nodes 312, or any other suitable nodes via member links 330E. In this example, user node 302 is linked via member link 330E to role node 306. As such, user "Bradley Norman" has a role of a "Beta Tester." Based on what nodes a user node 302 for a particular user is linked to, permission control computing device 102 determines permissions that are to be assigned to the particular user.

In this example, permission control computing device 102 may determine that because user node 302 is linked via member link 330E to role node 306, user "Bradley Norman" is a "Beta Tester" and thus should have the feature of "Wayfinding," as indicated by feature node 308A, enabled for application "Guide App" as indicated by application node 304. The feature of "Calendar" would also be enabled for user "Bradley Norman," because there is no role or location requirement for that feature. The feature of "Pathfinding," however, would only be enabled for user "Bradley Norman" when he is at facility "GPC," because that feature is not dependent at the role level (e.g., not linked to role node).

Node types other than those illustrated are also contemplated. For example, attribute-based control policy 300 may include "time" nodes specifying periods of time, such as dates, seasons, or time of day ranges, for example. For example, a feature node 308A, 308B, 308C linking to a time node may be enabled for the corresponding time period. As another example, attribute-based control policy 300 may include location nodes. Each location node may be associated with a geographical area (e.g., town, city, state, region, range of latitudes and longitudes, etc.). As an example, permission control computing device 102 may determine whether a user satisfies a location node requirement based on receiving GPS coordinates from a corresponding device, such as application processing device 112. Application processing device 112 may determine its GPS coordinates based on satellite data received from satellite 150, for example. Other node types are also contemplated.

In some examples, a feature node, such as feature node 308A, may be linked to both a location node and a role node 306. For example, a feature node 308A may be linked to only a location node or it may be linked only to a role node 306. For example, a feature may be made to be accessible (e.g., visible) to everyone at a particular location, or the feature may be made to be visible at any location but only for people in a particular role. In addition, in some examples a feature node 308A can be linked to both a role node 306 and a location node. In some examples a feature node 306A may not be linked to a location node nor a role node. For example, a feature node 306A that is not linked to either a location node or a role node may allow the feature to be visible to every person at every location. The attribute-based control policy 300 may use this configuration to turn on and off capabilities in the event a feature is decommissioned or needs to be turned on or off for any reason, for example.

In some examples, a particular feature (e.g., as indicated by a feature node 308A, 308B, 308C) may be enabled (e.g., as indicated by an enablement link 330D) when a user is linked to a combination of nodes (e.g., a role node 306 and a facility node 310A). For example, the feature of "Calendar" may be enabled only for users (as identified by a user node 302) that are associated with a facility (e.g., as indicated by a facility node 310A) and also are associated with a particular role (e.g., as indicated by a role node). Moreover, attribute-based control policy 300 may include various combinations of nodes, the satisfaction of any one of the combinations allowing for the enablement of one or more features.

In some examples, permission control computing device 102 generates attribute-based control policy 300 and stores attribute-based control policy 300 in database 116. For example, permission control computing device 102 may execute an application that allows a user to configure the requirements for each application feature. The application may allow the user to determine what combination of attributes are required for each feature of each application.

Figure 6A:
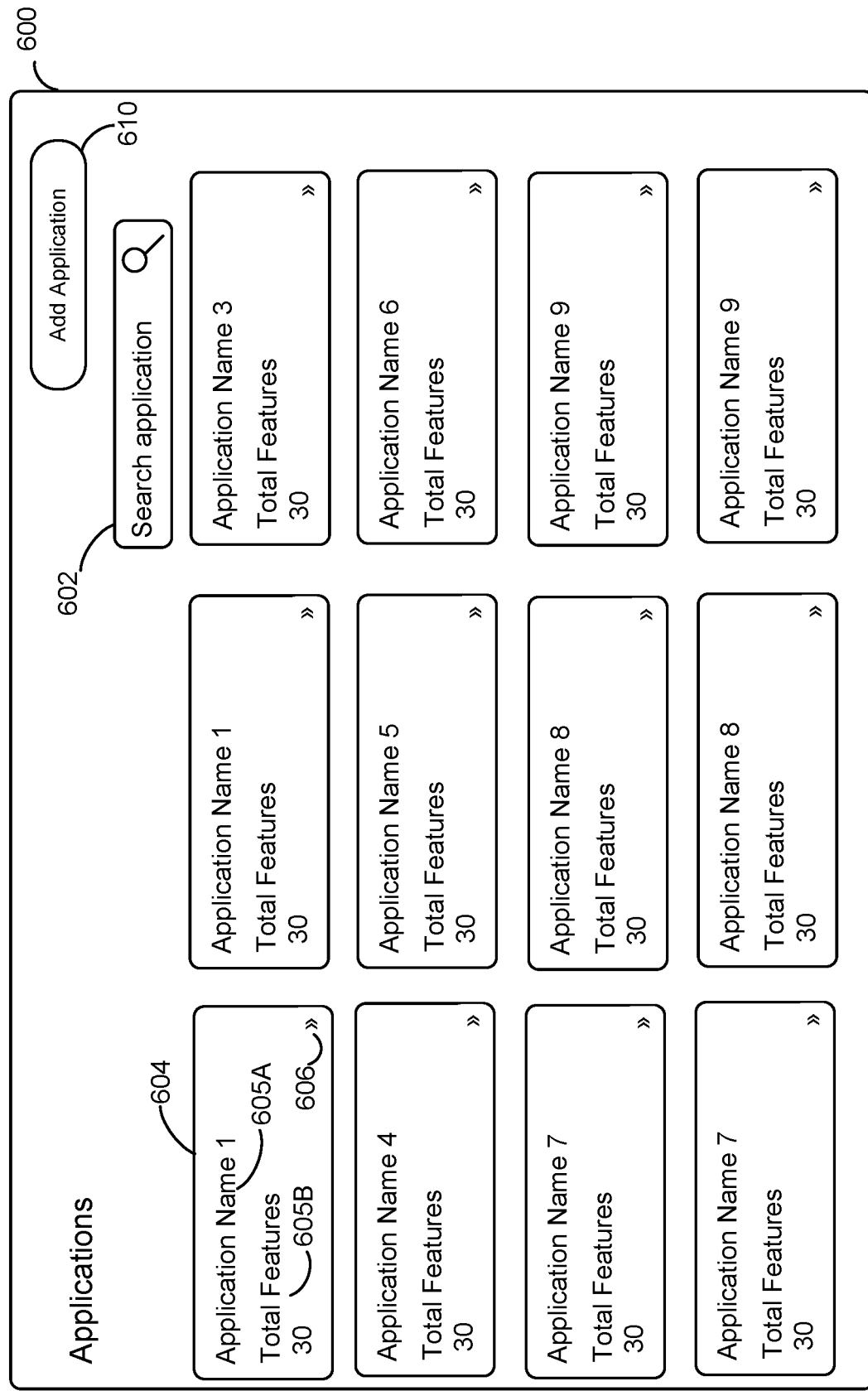
FIG. 6A illustrates an application configuration webpage to configure applications 1 in accordance with some embodiments.

For example, FIG. 6A illustrates an application configuration webpage 600 that allows for the configuration of one or more applications via a dedicated application window 604. Application configuration webpage 600 further includes a search bar 602 allow a user to search for a particular application, and an add application icon 610, allowing a user to add an application.

In this example, each application window 604 includes an application name 605A, and further identifies a number of features 605B (e.g., capabilities) associated with each application. To configure features of an application, a user may engage (e.g., click, touch) an arrow icon 606 of the corresponding application window 604.

Figure 6B:
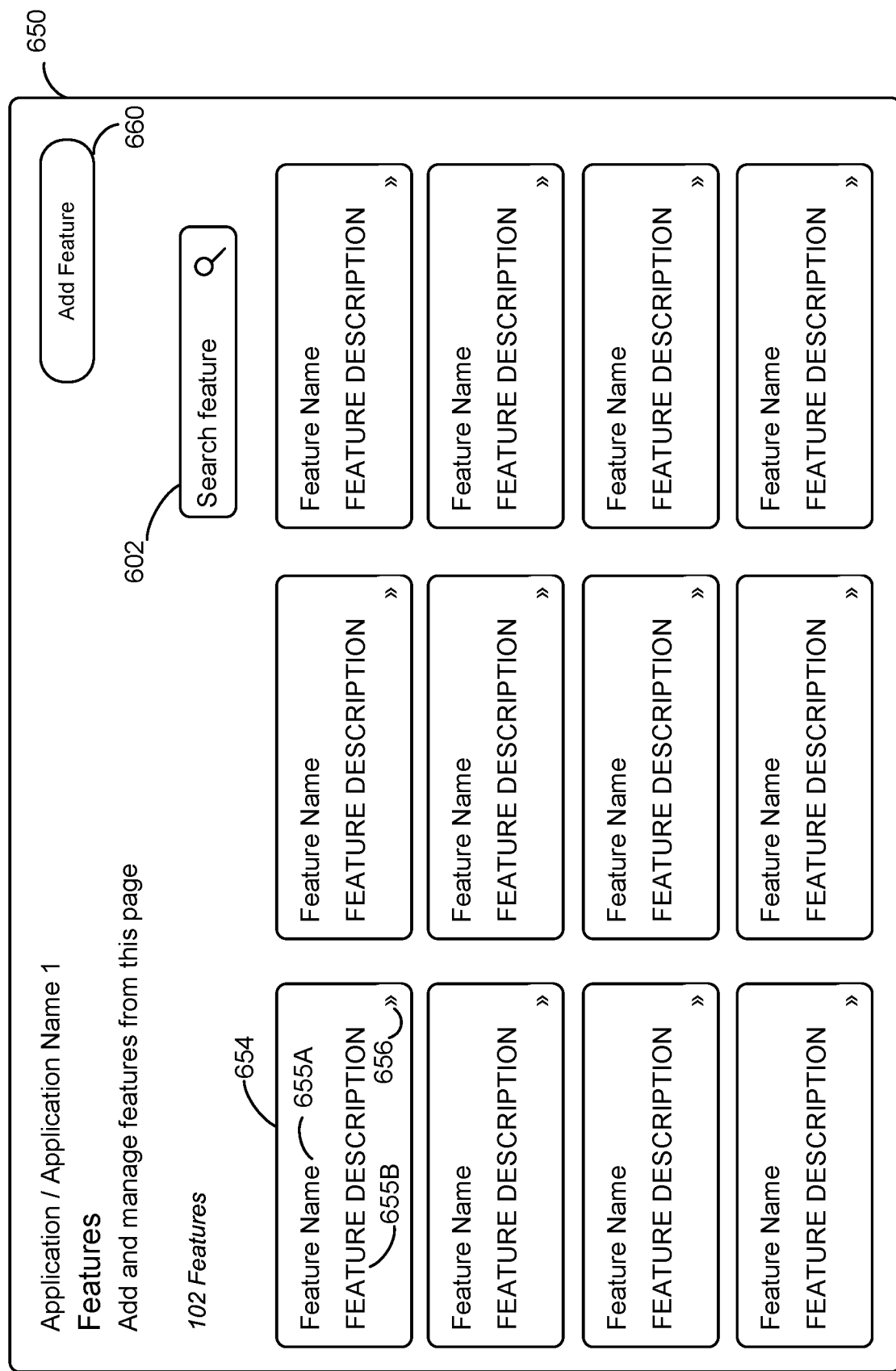
FIG. 6B illustrates a feature configuration webpage m accordance with some embodiments.

For example, FIG. 6B illustrates a feature configuration webpage 650 that allows for the configuration of one or more features of a corresponding application via feature windows 654. Feature configuration webpage 650 further includes a search bar 602 that allows a user to search for a particular application, and an add feature icon 660, allowing a user to add a feature for the corresponding application.

In some examples, permission control computing device 102 determines the features of the application based on feature data 184. For example, permission control computing device 102 may obtain application data 182 identifying the application, and determine the features of the application identified and characterized by feature data 184.

In this example, each feature window 654 is associated with a particular application feature and includes a feature name 655A, and a feature description 655B (e.g., capabilities). Each feature window 654 also includes an arrow icon 656 that, when engaged, allows the feature to be associated with one or more nodes of an attribute-based control policy, such as attribute-based control policy 300. As an example, a user may generate a corresponding application node 304 that is linked via implementation links 330A, 330B, 330C to corresponding feature nodes 308A, 308B, 308C. Further, a user may cause a feature to be enabled via an enablement link 330F, 330G to a facility node 310A, a city node 312, a role node 306, or any other node, such as a location node.

Referring back to FIG. 1, in some examples, permission control computing device 102 receives a request from an application processing device 110, 112, 114. The request may be for data for an application that executes on the application processing device 110, 112, 144. Permission control computing device 102 may determine a user of the application processing device 110, 112, 114. For example, the request may identify the application and may further include data identifying the user, such as login credentials (e.g., user name, user ID), or permission control computing device 102 may identify the user based on an identifier of the application processing device 110, 112, 114, such as an IP address, a MAC address, or any other suitable identifier. Permission control computing device 102 may then obtain, from database 116, user attribute data 180 for the user, which may identify a plurality of attributes of the identified user.

Permission control computing device 102 may then determine at least one permission for the user for the features of the application based on an attribute-based control policy stored in database 116, such as attribute-based control policy 300. As an example, permission control computing device 102 may identify within attribute-based control policy 300 an application node 304 associated with the application (e.g., by comparing the application name 320B to a name of the application corresponding to the request, or any other suitable identifiers), and determine one or more feature nodes 308A, 308B, 308C implemented by that application. Permission control computing device 102 may further determine, for each feature node 308A, 308B, 308C, other nodes (e.g., such as role nodes 306, facility nodes 310A, 310B, or any other node type) that each feature node is enabled for (e.g., via enablement links 330G, 330F). Permission control computing device 102 may also generate a user node 302 based on the plurality of attributes determined for the user, and generate, based on the attributes, member links 330E to corresponding nodes of attribute-based control policy 300.

For example, permission control computing device 102 may determine if, based on the attributes, the user corresponds to any role node, such as role node 306 (e.g., determine whether the attributes identify the user as a "Beta Tester"). Permission control computing device 102 may then determine permissions for each feature of the application based on feature nodes 308A, 308B, 308C linked via enablement links 330D, 330F to the corresponding nodes of attribute-based control policy 300 (e.g., feature nodes linked to other nodes that the user node 302 is also linked to). Permission control computing device 102 may then transmit the determined permission(s) for the user to the application processing device 110, 112, 114. The application processing device 110, 112, 114 may then configure the application in accordance with the received permissions. For example, the application processing device 110, 112, 114 may enable features (e.g., capabilities) of the application based on the received permissions, and may then execute the configured application.

In some examples, permission control computing device 102 receives a request for data for an application from an application processing device 110, 112, 114. Permission control computing device 102 obtains, from database 116, an attribute-based control policy for the application, such as attribute-based control policy 300. In some examples, permission control computing device 102 identifies the attribute-based control policy for the application from a plurality of attribute-based control policies (e.g., based on an application identifier in the request, or based on which HTTP endpoint of an API the request was transmitted to). Permission control computing device 102 then transmits the attribute-based control policy 300 for the application to the application processing device 110, 112, 114.

Application processing device 110, 112, 114 may then configure the application in accordance with the attribute-based control policy 300. For example, attribute-based control policy 300 may determine whether attributes for the user (which may be stored in local memory) correspond to any nodes (e.g., role nodes 306, facility nodes 310A, location nodes, time nodes, etc.) for which a feature of the application (e.g., as indicated by feature nodes 308A, 308B, 308C) is enabled. Application processing device 110, 112, 114 may configure the application in accordance with the attribute-based control policy 300, and may further execute the configured application. As such, a user operating application processing device 110, 112, 144 would have access to the application in accordance with the received attribute-based control policy 300.

Figure 2:
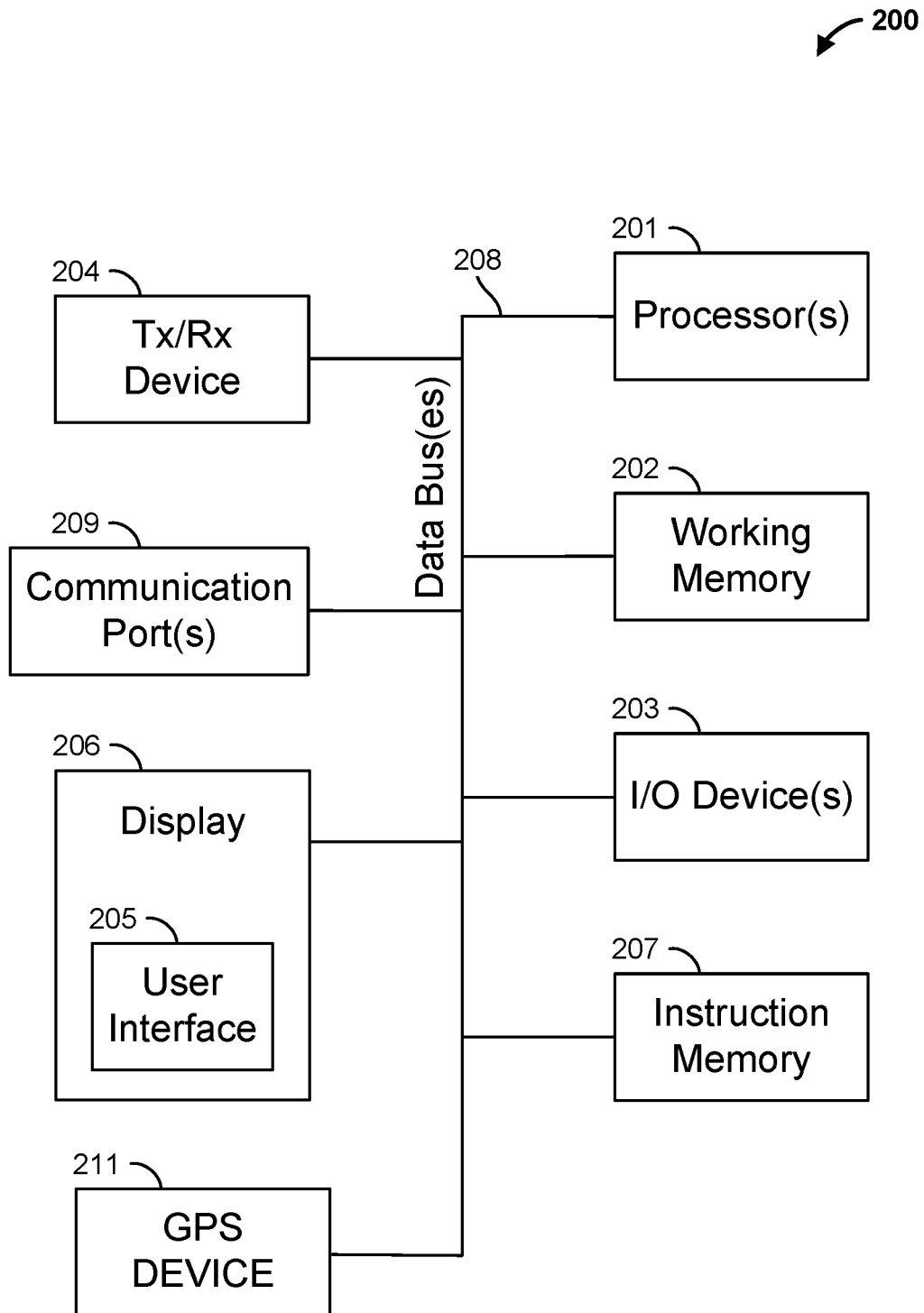
FIG. 2 is a block diagram of an exemplary computing device in accordance with some embodiments.

FIG. 2 illustrates an example computing device 200. Computing device 200 may be an example of permission control computing device 102 or application processing device 110, 112, 114 of FIG. 1. Computing device 200 can include one or more processors 201, working memory 202, one or more input/output devices 203, instruction memory 207, a transceiver 204, one or more communication ports 209, a global position system (GPS) device 211, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 201 can be configured to perform a certain function or operation by executing code, stored on instruction memory 207, embodying the function or operation. For example, processors 201 can be configured to execute code stored in instruction memory 207 to perform one or more of any function, method, or operation disclosed herein.

Additionally processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of permission control computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as shelf configuration data.

Display 206 can display user interface 205. User interfaces 205 can enable user interaction with computing device 200. For example, user interface 205 can be a user interface for an application that is configured in accordance with an attribute-based control policy 300. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 permission control computing device 102 will be operating in. Processor(s) 201 is operable to receive data from, or send data to, a network, such as communication network 118 of FIG. 1, via transceiver 204.

GPS device 211 allows for communications with the GPS, such as one or more satellites 150. In some examples, computing device 200 can receive location data, such as latitude and longitude data, from the GPS via GPS device 211. Computing device 200 may then determine its location based on the received location data. In some examples, computing device 200 transmits the location data. In some examples, computing device 200 determines whether its located within a geographical region based on the received location data.

Figure 4:
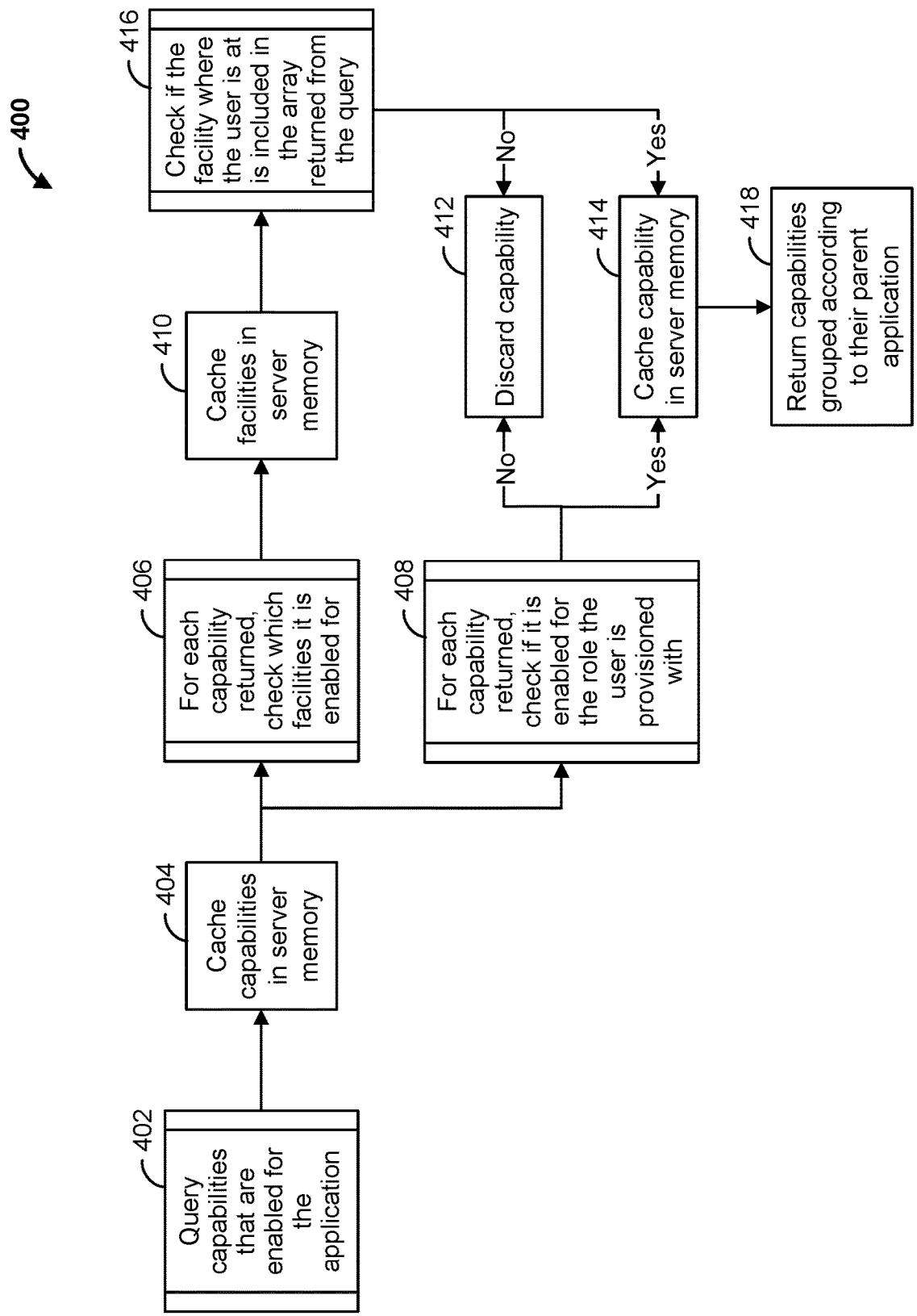
FIG. 4 is a flowchart of an example method that can be carried out by the application control system of FIG. 1 in accordance with some embodiments.

FIG. 4 illustrates a flowchart of an example method 400 that can be carried out by a computing device, such as the permission control computing device 102 of FIG. 1. At step 402, capabilities of an application that are enabled (e.g., that the application supports) are queried. For example, permission control computing device 102 may determine, from feature data 182, a plurality of capabilities of an application. At step 404, the capabilities are cached in memory. For example, the capabilities may be stored in working memory 202. From step 404, the method proceeds to steps 406 and 408.

At step 406, a determination is made as to which facility(ies) each capability is enabled for. For example, permission control computing device 102 may determine which facilities each capability of the application is enabled for based on an attribute-based control policy, such as attribute-based control policy 300.

From step 406 the method proceeds to step 410, where the facilities are cached in memory. The method then proceeds to step 416, where a determination is made as to whether the user is associated with any of the facilities. For example, permission control computing device 102 may determine the facilities the user is associated with based on user attribute data 180 for the user, and may further determine whether any capabilities of the application are enabled for those facilities based on the attribute-based control policy. If a capability is not enabled with any facility associated with the user, the capability is discarded (e.g., removed from consideration) at step 412. Otherwise, if the capability is associated with a facility associated with the user, the capability is stored in memory at step 414.

Back at step 408, a determination is made as to whether each capability is associated with a role that the user is provisioned with. For example, permission control computing device 102 may determine a role of the user based on user attribute data 180 for the user, and further determine the capabilities enabled for that role based on the attribute-based control policy. If a capability is enabled for a role the user is associated with, the capability is stored in memory at step 414. Otherwise, if the capability is not enabled for any role the user is associated with, the capability is discarded at step 412.

From step 414 the method proceeds to step 418, where the capabilities stored in memory are returned. For example, the capabilities may be returned from a function call executing on an application processing devices 110, 112, 114, or may be transmitted from permission control computing device 102 to an application processing devices 110, 112, 114. In some examples the capabilities are grouped according to their parent application. For example, a first set of capabilities of a first group may correspond to a first application, and a second set of capabilities of a second group may correspond to a second application. In some examples, an application is configured in accordance with the returned capabilities.

Figure 5:
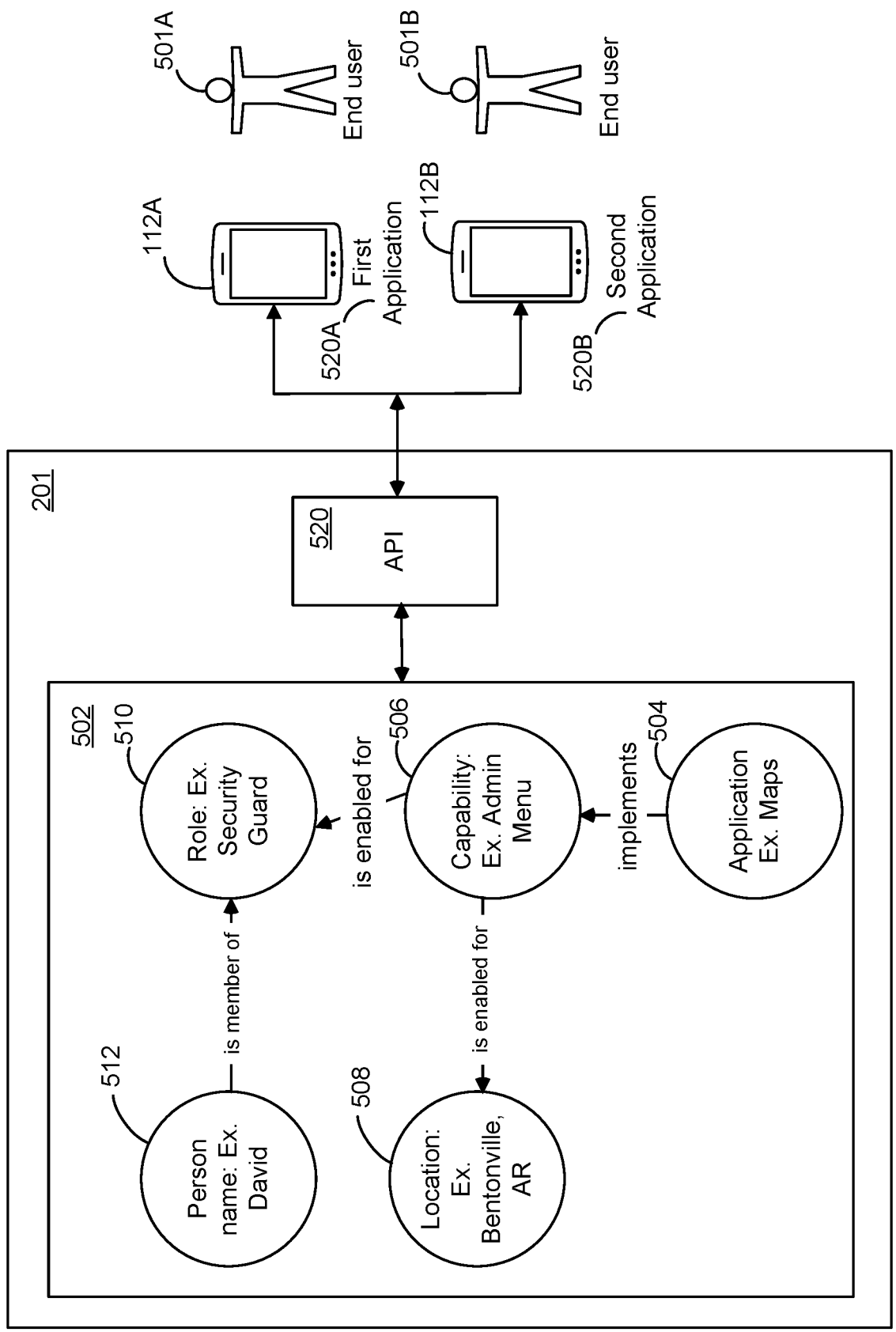
FIG. 5 is a block diagram of an application control system in accordance with some embodiments.

FIG. 5 illustrates a block diagram of an application control system 500 that includes an attribute-based control policy 502 and an API 520 implemented by processor 201 executing instructions, such as instructions stored in instruction memory 207, and application processing devices 112A, 112B operated by corresponding end users 501A, 501B. In this example, application control system 500 includes a user node 512, a location node 508, a role node 510, a capability (e.g., feature) node 506, and an application node 504. Application node 504 (e.g., a "Maps" application) can implement the capability of an "Admin Menu" as indicated by capability node 506. Moreover, the "Admin Menu" is to be enabled for all users that are "Security Guards" as indicated by role node 510, and when a user is associated with, or located in, location "Bentonville, AR" as indicated by location node 508.

Processor 201 may receive a request for data from application processing device 112A for a first application 520A. The request may identify first user 501A (e.g., via a user name or other identifier). In some examples, processor 201 identifies first user 501A based on configuration settings within a database, such as database 116 (e.g., data indicating that the application processing device 112A belongs to or is checked out to first user 501A). Processor 201 may determine that attribute-based control policy 502 corresponds to the first application 520A, and may transmit the attribute-based control policy 502 to application processing device 112A.

Upon receiving attribute-based control policy 502, application processing device 112A may configure the first application 520A. For example, application processing device 112A may determine if first user 501A is associated with a role of "Security Guard" based on, for example, attributes associated with first user 501A (e.g., user attribute data 180 stored in instruction memory 207). Similarly, application processing device 112A may determine if first user 501A is associated with a location of "Bentonville, AR" based on, for example, attributes associated with first user 501A. For example, application processing device 112A may obtain location data (e.g., via GPS device 211 in communication with satellite 150), and determine a geographic area application processing device 112A is located within.

Assuming application processing device 112A determines that first user 501A is not associated with a role of "Security Guard" and is also not associated with the location of "Bentonville, AR" (e.g., application processing device 112A determines its geographic location is "San Bruno, CA"), application processing device 112A configures the first application 520A (e.g., application "Maps") so that it will execute without the "Admin Menu" feature.

In some examples, if processor 201 determines that no attribute-based control policy corresponds to first application 520A, processor 201 configures first application 520A with all capabilities available. In some examples, if processor 201 determines that no attribute-based control policy corresponds to first application 520A, processor 201 disables first application 520A (e.g., prevents first application 520A from executing).

Similarly, processor 201 may receive a request for data from application processing device 112B for a second application 520B. The request may identify second user 501B (e.g., via a user name or other identifier). In some examples, processor 201 identifies second user 501B based on configuration settings within a database, such as database 116 (e.g., data indicating that the application processing device 112B belongs to or is checked out to second user 501B). Processor 201 may determine that attribute-based control policy 502 corresponds to the second application 520B, and may transmit the attribute-based control policy 502 to application processing device 112B.

Upon receiving attribute-based control policy 502, application processing device 112B may configure the second application 520B. For example, application processing device 112B may determine if second user 501B is associated with a role of "Security Guard" based on, for example, attributes associated with first user 501B (e.g., user attribute data 180 stored in instruction memory 207). Similarly, application processing device 112A may determine if second user 501B is associated with a location of "Bentonville, AR" based on, for example, attributes associated with first user 501B.

Assuming application processing device 112A determines that second user 501B is associated with a role of "Security Guard" or is associated with the location of "Bentonville, AR," application processing device 112A configures the second application 520B (e.g., application "Maps") so that it will execute with the "Admin Menu" feature.

In some examples, if processor 201 determines that no attribute-based control policy corresponds to first application 520A, processor 201 configures second application 520B with all capabilities available. In some examples, if processor 201 determines that no attribute-based control policy corresponds to second application 520B, processor 201 disables second application 520B (e.g., prevents second application 520B from executing).

Figure 7A:
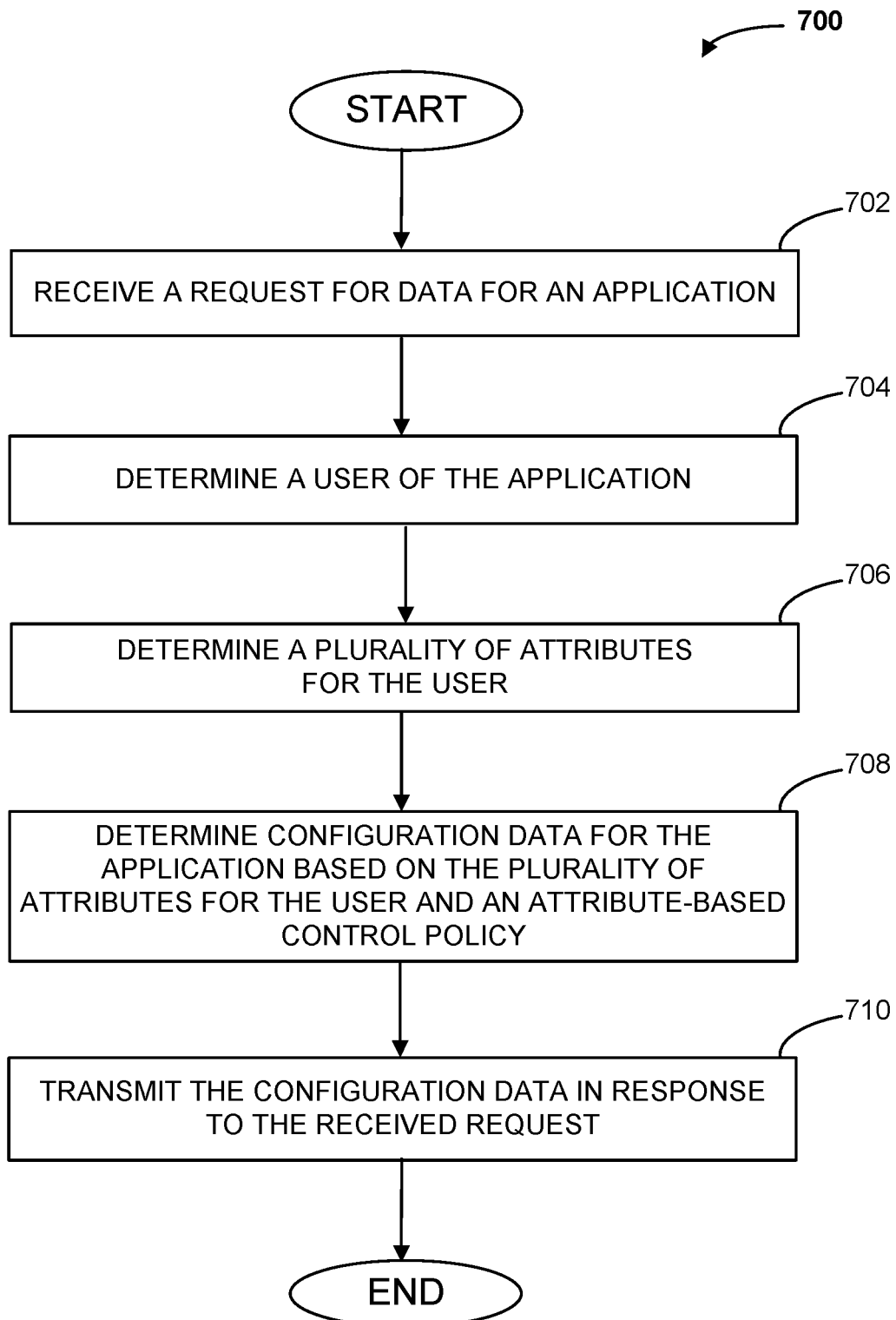
FIG. 7A is a flowchart of an example method that can be carried out by the application control system of FIG. 1 in accordance with some embodiments.

FIG. 7A is a flowchart of an example method 700 that can be carried out by a computing device, such as permission control computing device 102 of FIG. 1. At step 702, a request for data for an application (e.g., first application 520A or second application 520B) is received (e.g., from an application processing device 110, 112, 114). At step 704, a user of the application is determined. For example, the user may be identified in the request, or permission control computing device 102 may determine the user based on a configuration setting, or an identifier (e.g., IP address or MAC address) of the computing device transmitting the request. At step 706, a plurality of attributes are determined for the user. For example, permission control computing device 102 may obtain user attribute data 180 corresponding to the user from database 116.

Proceeding to step 708, configuration data is generated for the application based on the plurality of attributes and an attribute-based control policy. The configuration data identifies and characterizes a configuration of the application. For example, permission control computing device 102 may identify and obtain attribute-based control policy data 186 identifying and characterizing an attribute-based control policy, among a plurality of attribute-based control policies, for the application from database 116. Permission control computing device 102 may further determine capabilities to be enabled for the application based on applying the plurality of attributes of the user to the obtained attribute-based control policy, and generate the configuration data based on the determined capabilities. For example, the configuration data may identify what capabilities of the application are to be enabled.

At step 710, the configuration data is transmitted in response to the request. For example, permission control computing device 102 may transmit the configuration data to the application processing device 110, 112, 114 that transmitted the request. The method then ends.

Figure 7B:
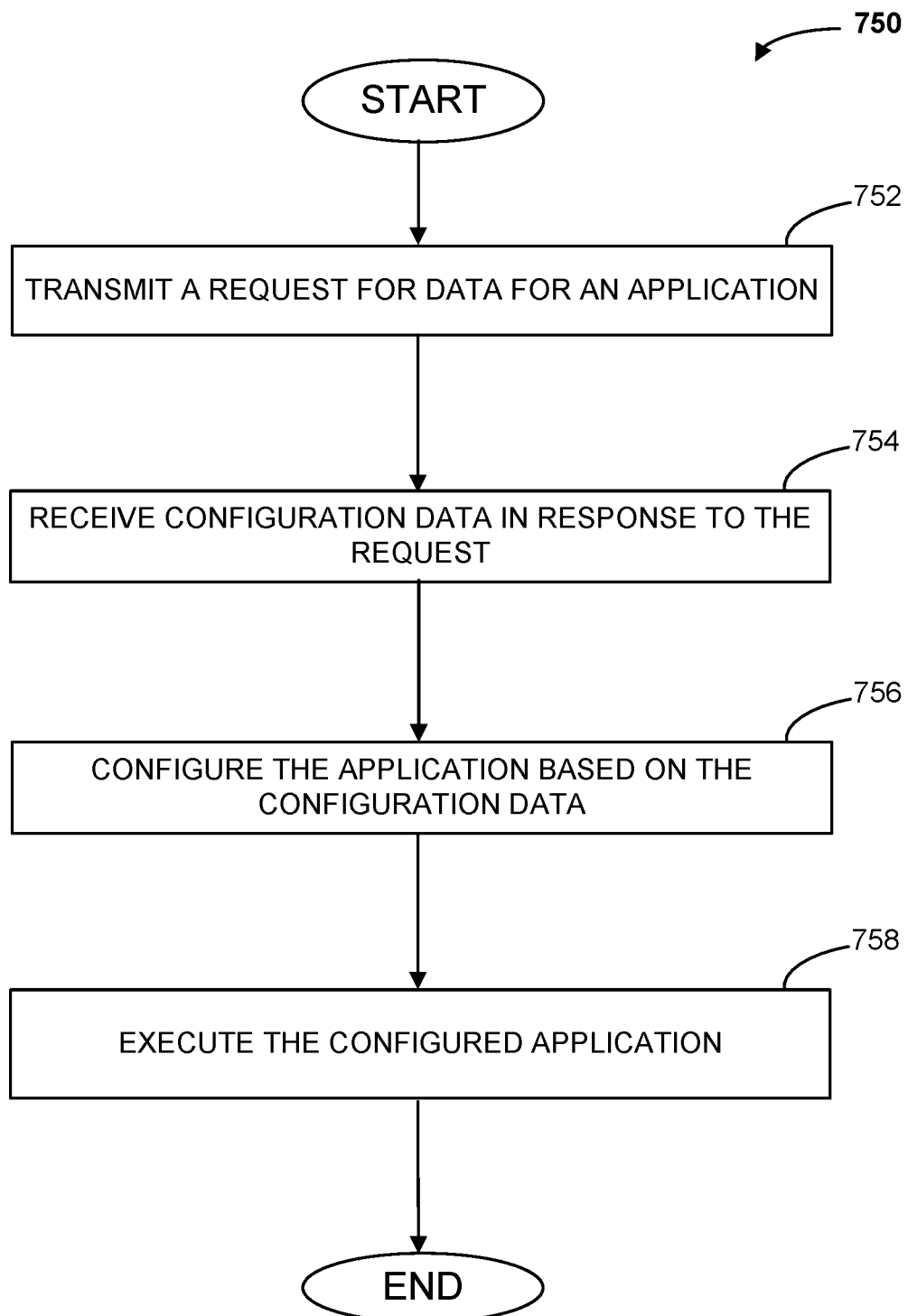
FIG. 7B is flowchart of another example method that can be carried out by the application control system of FIG. 1 in accordance with some embodiments.

FIG. 7B is a flowchart of an example method 750 that can be carried out by a computing device, such as an application processing device 110, 112, 114 of FIG. 1. At step 752, a request for data is transmitted. For example, application processing device 110 may transmit a request for data for an application to permission control computing device 102. At step 754 configuration data for the application is received in response to the request. For example, application processing device 110 may configuration data as described above with respect to FIG. 7A from permission control computing device 102.

Proceeding to step 756, the application is configured based on the configuration data. For example, application processing device 110 may enable features identified as enabled by the configuration data, but disable other features. At step 758, the configured application is executed. For example, application processing device 110 may receive an input from a user (e.g., via user interface 205) to execute the application. In response, application processing device 110 executes the configured application, allowing the user access to the enabled features, but not the disabled features. The method then ends.

Figure 8A:
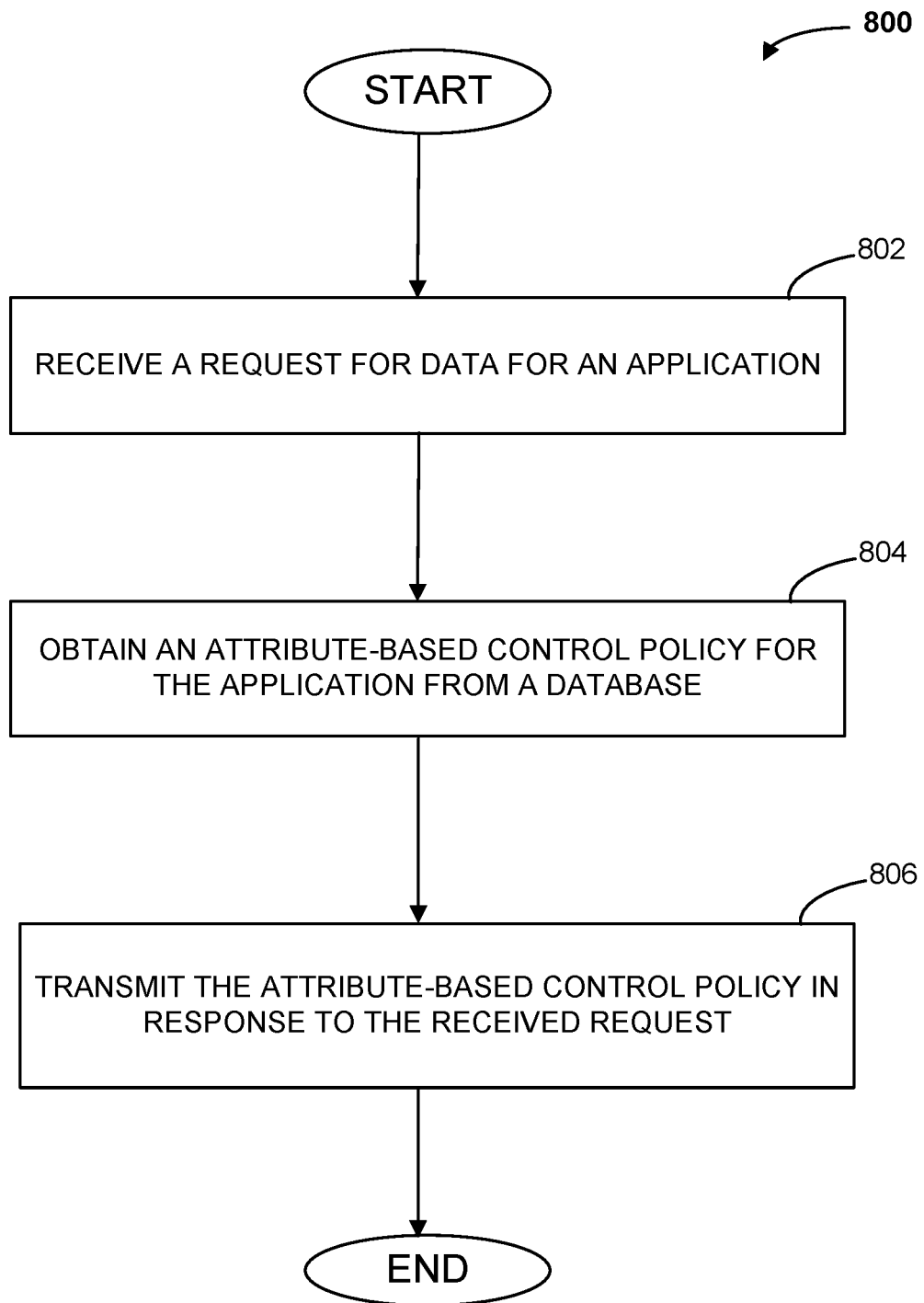
FIG. 8A is a flowchart of yet another example method that can be carried out by the application control system of FIG. 1 in accordance with some embodiments.

FIG. 8A is a flowchart of an example method 800 that can be carried out by a computing device, such as permission control computing device 102 of FIG. 1. At step 802, a request for data for an application is received from an application processing device 110, 112, 114. At step 804, an attribute-based control policy for the application is obtained from a database, such as database 116. At step 806, the attribute-based control policy is transmitted to the application processing device 110, 112, 114 in response to the request. The method then ends.

Figure 8B:
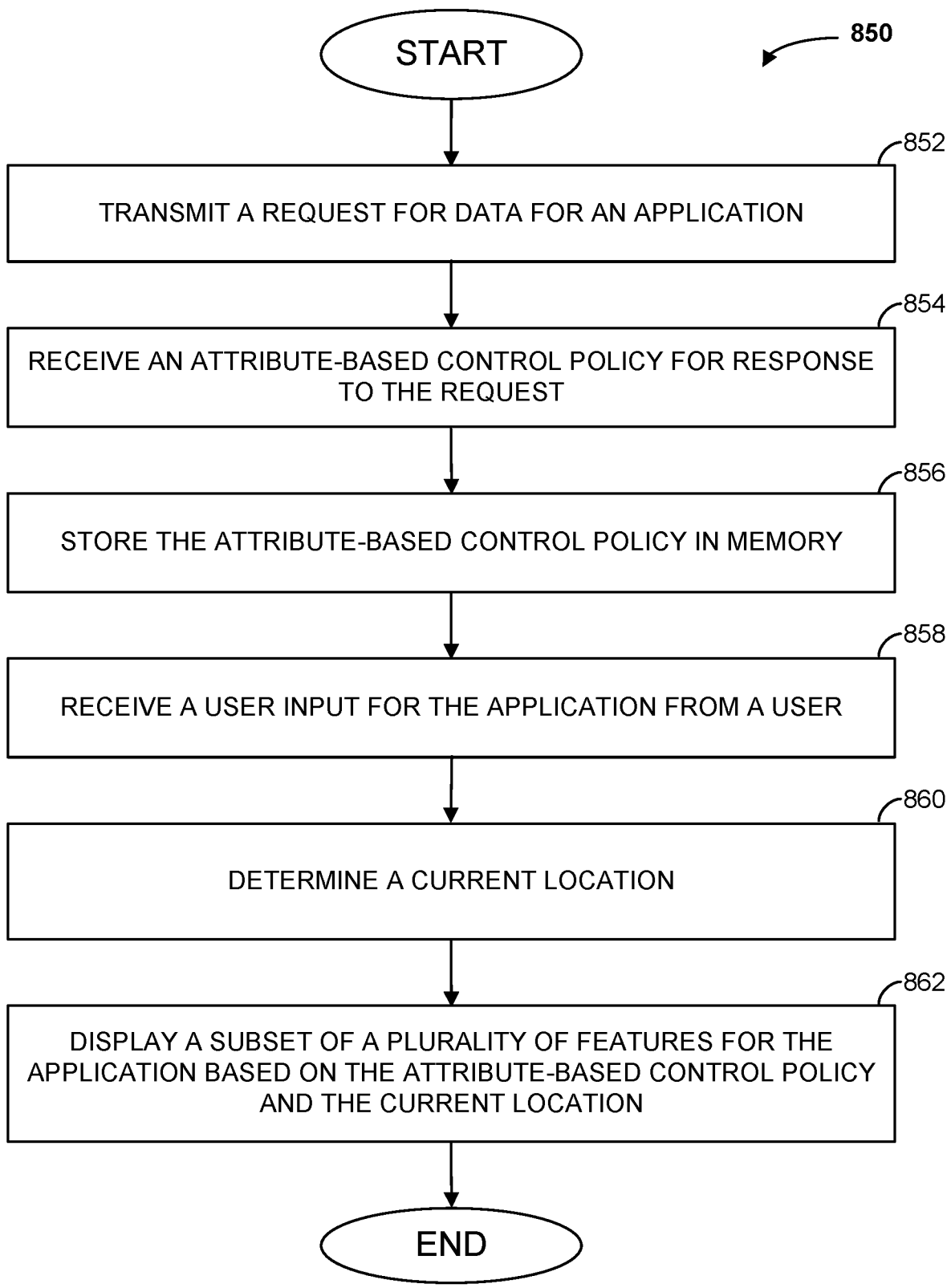
FIG. 8B is a flowchart of another example method that can be carried out by the application control system of FIG. 1 in accordance with some embodiments.

FIG. 8B is a flowchart of an example method 850 that can be carried out by a computing device, such as an application processing device 110, 112, 114 of FIG. 1. Beginning at step 852, a request for data for an application is transmitted. For example, application processing device 110 may transmit a request for data for an application, such as first application 520A, to permission control computing device 102. At step 854, an attribute-based control policy for the application is received in response to the request. For example, permission control computing device 102 may obtain from a database an attribute-based control policy for the application, and may transmit the attribute-based control policy to application processing device 110. At step 856, the attribute-based control policy is stored in memory. For example, application processing device 110 may store the attribute-based control policy in working memory 202.

Proceeding to step 858, a user input is received for the application from the user. For example, the user may engage (e.g., click) an icon on user interface 205 of application processing device 110 to cause the execution of the application. At step 860, a current location is determined. For example, application processing device 110 may obtain location data from GPS device 211, and determine a geographic area of its location based on the location data. At step 862, in response to the user input, a subset of a plurality of features are displayed for the application. The subset of the plurality of features to display are determined based on the attribute-based control policy and the determined current location.

For example, application processing device 110 may determine whether its location corresponds to a location node within the attribute-based control policy that is linked via an enablement link to a feature node for the application. If its location corresponds to such a location node, application processing device 110 configures the application with the corresponding feature, and executes the configured application such that it displays with the corresponding feature. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a first computing device configured to:
transmit a request for data for an application for a user to a second computing device, wherein the request comprises an identifier of the user and a location of the user;
receive, in response to the request, an attribute-based control policy for the application, where the attribute-based control policy defines permissions for the application based on a plurality of attributes;
store, within a memory, the attribute-based control policy for the application;
receive, on a user interface, a user input from a user, the user input causing an execution of the application;
determine a current location of the user in response to the execution of the application; and
in response to the user input, display a subset of a plurality of features for the application based on the attribute-based control policy and the current location.

2. The system of claim 1, wherein the attribute-based control policy comprises an application node identifying the application, and a plurality of feature nodes identifying the plurality of features of the application.

3. The system of claim 2, wherein the attribute-based control policy links at least one feature node of the plurality of feature nodes to a location node, and the location node is linked to at least one role node.

4. The system of claim 2, wherein the attribute-based control policy comprises a time node identifying a period of time, wherein the period of time may be associated with seasons, time of day ranges, or dates.

5. The system of claim 4, wherein at least one feature node of the plurality of feature nodes is linked to the time node.

6. The system of claim 1, wherein the computing device is configured to identify the attribute-based control policy for the application from a plurality of attribute-based control policies based on an application identifier received in the request.

7. The system of claim 1, wherein the attribute-based control policy comprises a location node identifying the location, and wherein the location node is linked to a feature node identifying one of the plurality of features of the application.

8. A method by a first computing device comprising:
transmitting a request for data for an application for a user to a second computing device, wherein the request comprises an identifier of the user and a location of the user;
receiving, in response to the request, an attribute-based control policy for the application, where the attribute-based control policy defines permissions for the application based on a plurality of attributes;
storing, within a memory, the attribute-based control policy for the application;
receiving, on a user interface, a user input from a user, the user input causing an execution of the application;
determining a current location of the user in response to the execution of the application; and
in response to the user input, displaying a subset of a plurality of features for the application based on the attribute-based control policy and the current location.

9. The method of claim 8, wherein the attribute-based control policy comprises an application node identifying the application, and a plurality of feature nodes identifying the plurality of features of the application.

10. The method of claim 9, wherein the attribute-based control policy links at least one feature node of the plurality of feature nodes to a location node, and the location node is linked to at least one role node.

11. The method of claim 9, wherein the attribute-based control policy comprises a time node identifying a period of time, wherein the period of time may be associated with seasons, time of day ranges, or dates.

12. The method of claim 11, wherein at least one feature node of the plurality of feature nodes is linked to the time node.

13. The method of claim 8 comprising identifying the attribute-based control policy for the application from a plurality of attribute-based control policies based on an application identifier received in the request.

14. The method of claim 8, wherein the attribute-based control policy comprises a location node identifying the location, and wherein the location node is linked to a feature node identifying one of the plurality of features of the application.

15. A non-transitory computer readable medium having instructions stored thereon, wherein the instructions, when executed by at least one processor, cause a first computing device to perform operations comprising:
transmitting a request for data for an application for a user to a second computing device, wherein the request comprises an identifier of the user and a location of the user;
receiving, in response to the request, an attribute-based control policy for the application, where the attribute-based control policy defines permissions for the application based on a plurality of attributes;
storing, within a memory, the attribute-based control policy for the application;
receive, on a user interface, a user input from a user, the user input causing an execution of the application;
determining a current location of the user in response to the execution of the application; and
in response to the user input, displaying a subset of a plurality of features for the application based on the attribute-based control policy and the current location.

16. The non-transitory computer readable medium of claim 15 having instructions stored thereon, wherein the attribute-based control policy comprises an application node identifying the application, and a plurality of feature nodes identifying features of the application.

17. The non-transitory computer readable medium of claim 16 having instructions stored thereon, wherein the attribute-based control policy links at least one feature node of the plurality of feature nodes to a location node, and the location node is linked to at least one role node.

18. The non-transitory computer readable medium of claim 16 having instructions stored thereon, wherein the attribute-based control policy comprises a time node identifying a period of time, wherein the period of time may be associated with seasons, time of day ranges, or dates, and wherein the attribute-based control policy links at least one feature node of the plurality of feature nodes to the time node.

19. The non-transitory computer readable medium of claim 15 having instructions stored thereon, wherein the instructions cause the first computing device to perform operations further comprising identifying the attribute-based control policy for the application from a plurality of attribute-based control policies based on an application identifier received in the request.

20. The non-transitory computer readable medium of claim 15 having instructions stored thereon, wherein the attribute-based control policy comprises a location node identifying the location, and wherein the location node is linked to a feature node identifying one of the plurality of features of the application.

* * * * *